United States Patent
Nadig et al.

(10) Patent No.: US 11,334,712 B1
(45) Date of Patent: May 17, 2022

(54) REDUCING UNINTENDED AUTOMATION EVENTS

(71) Applicant: Amazon Technologies, Inc., Seattle, WA (US)

(72) Inventors: Vinaya Nadig, Redmond, WA (US); Bo Li, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 16/450,445

(22) Filed: Jun. 24, 2019

(51) Int. Cl.
*G06F 40/20* (2020.01)
*G10L 15/30* (2013.01)
*G10L 15/22* (2006.01)

(52) U.S. Cl.
CPC .............. *G06F 40/20* (2020.01); *G10L 15/22* (2013.01); *G10L 15/30* (2013.01); *G10L 2015/226* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 6,622,119 B1* | 9/2003 | Ramaswamy | ........ | G06F 40/274 704/9 |
| 9,966,065 B2* | 5/2018 | Gruber | .................. | G06F 40/205 |
| 10,303,715 B2* | 5/2019 | Graham | .................. | G10L 15/22 |
| 10,755,703 B2* | 8/2020 | Zeitlin | ................ | G10L 15/1815 |
| 2015/0348551 A1* | 12/2015 | Gruber | ................ | H04M 3/4936 704/235 |
| 2016/0151603 A1* | 6/2016 | Shouldice | ................ | H04R 3/00 600/28 |
| 2018/0336275 A1* | 11/2018 | Graham | .................. | G06F 9/453 |
| 2019/0341027 A1* | 11/2019 | Vescovi | .................. | G10L 15/22 |
| 2020/0372904 A1* | 11/2020 | Vescovi | ............. | G10L 15/1815 |

FOREIGN PATENT DOCUMENTS

EP 1102177 A2 * 5/2001 ............. G06F 40/35

* cited by examiner

*Primary Examiner* — Marcus T Riley
(74) *Attorney, Agent, or Firm* — Pierce Atwood LLP

(57) ABSTRACT

Described are techniques for minimizing the performance of sets of actions in undesired situations. For example, a set of actions may be triggered based on a sensor detecting the presence of an individual, but the sensor may be faulty and trigger the set of actions to be performed based on false detections of an individual. A system may maintain a record of past executions of sets of actions. The system may analyze the past executions to determine a frequency with which a set of actions was executed, whether the past executions resulted in failed processing, etc. If the system determines, based on these determinations, that a set of actions should not be performed in the present instance, the system prevents the set of actions from being performed. The system may notify a user of such and provide the user with the ability to override the system's determination.

20 Claims, 9 Drawing Sheets

FIG. 4

| Profile Identifier | Plurality of Actions Identifier | Plurality of Actions Trigger | Plurality of Actions | Timestamp | Processing Duration | Resource Called | Action Status | Plurality of Actions Status |
|---|---|---|---|---|---|---|---|---|
| HG1Z3 | 1234 | Sensor data indicating an individual is detected | Turn on smart light | May 1, 2019 8:30 am | 0.5 seconds | SmartHome Skill | Completed | TimedOut |
| | | | Output news stories | May 1, 2019 8:30 am | 2 seconds | News Skill | TimedOut | |

REDUCING UNINTENDED AUTOMATION EVENTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 illustrates example types of data that may be stored with respect to a plurality of actions, in accordance with embodiments of the present disclosure.

DETAILED DESCRIPTION

Figure 1:
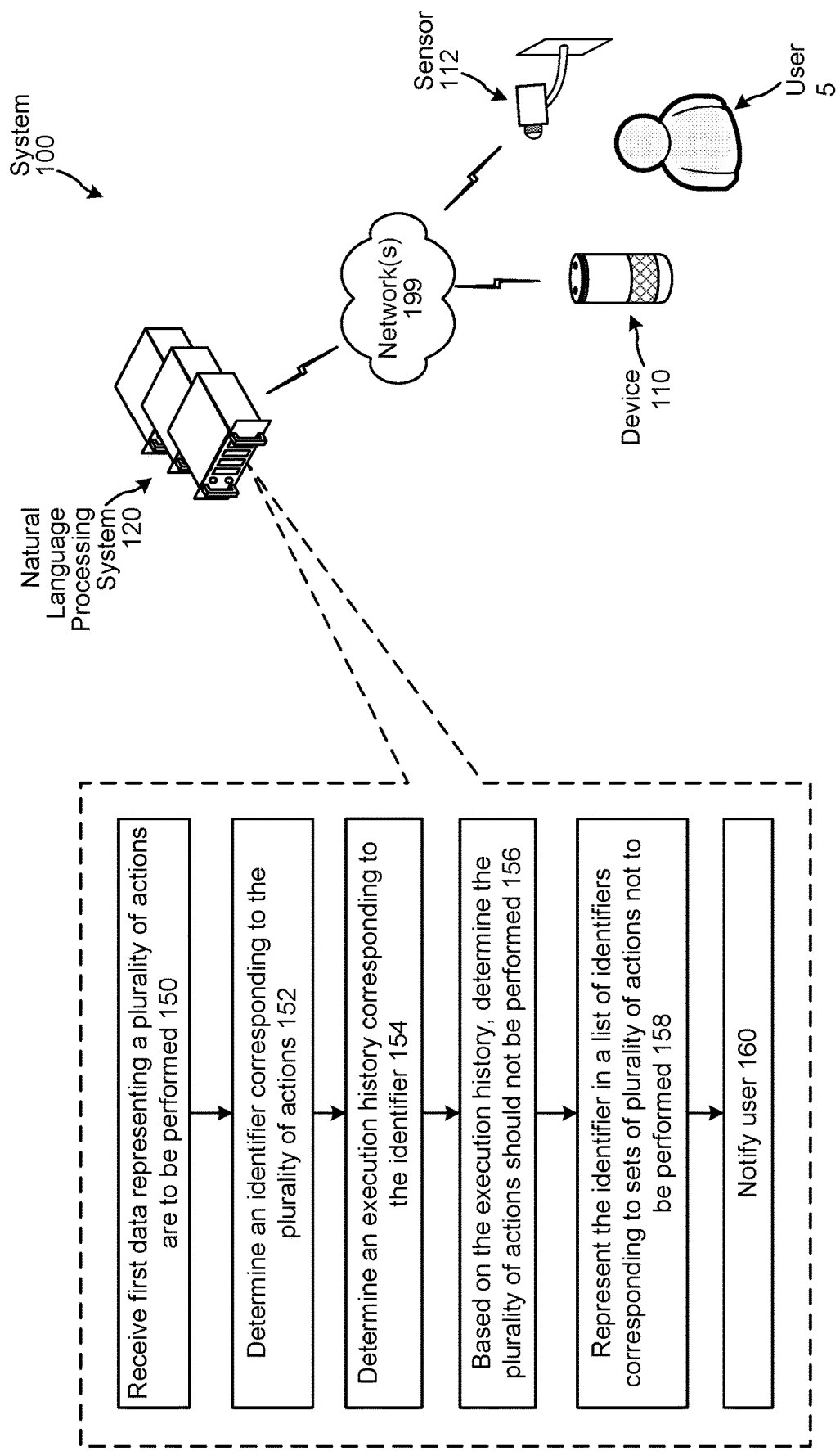
FIG. 1 illustrates a system for detecting and mitigating the performance of actions at times when a user does not desire the actions be performed, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A natural language processing system may send data to a skill, which in turn sends the data to a backend system for the purpose of the backend system performing an action responsive to a natural language input (e.g., corresponding to text data and/or audio data input by a user). As used herein, a "skill" may refer to a component that passes data between a natural language processing system and one or more backend systems. In other words, a skill may provide an interface between a natural language processing system and one or more backend systems. In at least some examples, a skill may communicate with a natural language processing system via an application program interface (API).

In some instances, a single action may be performed in response to a natural language input (e.g., corresponding to a single spoken or text/typed natural language input). For example, for the natural language user input "play Adele music," a natural language processing system may send NLU data (representing the natural language user input) to a music skill, which may send the NLU data to a music backend system, which may in turn cause music, sung by an artist named Adele, to be output to the user. For further example, for the natural language user input "turn on the lights," a natural language processing system may send NLU data (representing the natural language user input) to a smart home skill, which may send the NLU data to a smart home backend system, which may in turn send a command to a smart light to "turn on." In another example, for the natural language user input "book me a ride to my favorite restaurant," a natural language processing system may send NLU data (representing the natural language user input) to a taxi skill, which may send the NLU data to a taxi backend system, which may in turn book a trip to the user's favorite restaurant (e.g., as represented in the user's profile), and cause the natural language processing system to output synthesized speech representing such booking. In at least some examples, a skill may reformat data, received from a natural language processing system, into a format understandable by a corresponding backend system. Actions, in the foregoing examples, correspond to the outputting of music, turning on of "smart" lights, and booking of the trip coupled with output of the synthesized speech. As such, as used herein, an "action" may refer to some result of a natural language processing system's processing.

In other instances, multiple actions may be performed in response to a single natural language user input. For example, in response to the natural language user input "perform return home routine," a smart home skill may be invoked to turn on "smart" lights associated with a user's profile, and a news skills may be invoked to output news stories for a geographic region corresponding to the user profile. In the foregoing example, the actions performed are the turning on of "smart" lights and the outputting of news stories.

In some instances, multiple actions may be performed in response to a signal received from a sensor. For example, a smart home skill (of a natural language processing system) may communicate with (or include) a motion sensor located in a user's house. When the motion sensor detects an individual has entered the house, the motion sensor may send a signal, representing presence of the individual, to the smart home skill. The smart home skill may communicate that signal to sequencing component of the natural language processing system. The sequencing component may determine multiple actions to be performed in response to the signal. For example, the sequencing component may cause the smart home skill to turn on "smart" lights associated with a user's profile, and cause a news skill to output news stories for a geographic region corresponding to the user profile.

As used herein, a "routine" may refer to a trigger (e.g., a natural language user input, a signal output from a sensor, etc.) and a corresponding one or more actions that are to be performed in response to the trigger.

A plurality of actions, performed in response to a single natural language user input, may be user defined. In at least some examples, a user may define a plurality of actions through a companion application installed on the user's mobile device (e.g., smart phone, tablet, etc.). A companion application may enable the user's mobile device to communicate with the natural language processing system. An example companion application is the Amazon Alexa application that may be installed on a smart phone, tablet, or the like.

A plurality of actions to be performed may alternatively be suggested to a user by a natural language processing system or other system/component. For example, a natural language processing system may, with user permission, record a history of natural language user inputs and corresponding actions performed in response thereto. The natural language processing system or other system/component configured to analyze the relevant data may be configured to recognize patterns in such a record. For example, a may determine that a user routinely queries the system to output news stories in response to the user querying the system to turn on one or more smart lights associated with the user's profile. In response to determining the pattern, the system may recommend to the user that the smart light(s) may be turned on and news stories may be output in response to future queries of the user that simply request the smart light(s) be turned on.

Situations may arise in which a system may be triggered to perform a plurality of actions when such would be unbeneficial from a user perspective. For example, as described above, a natural language processing system may perform a plurality of actions in response to a signal received from a sensor. At some point, the sensor may malfunction. For example, the sensor may falsely detect the presence of an individual. Even though the sensor falsely detects an individual, the sensor may nonetheless send, to the natural language processing system, a signal representing an individual was detected. And in response to receiving the signal, the natural language processing system may perform a corresponding plurality of actions. Since the performance of these actions resulted from a false detection of the sensor, it may be considered that the user did not want the natural language processing system to perform the actions at that time.

Performing actions, when a user does not intend for the actions to be performed, may result in an undesirable user experience. Moreover, such undesirable performance of actions may inhibit the natural language processing system's ability to, in real-time or near real-time, perform actions intended to be performed by other users of the natural language processing system. This may result from the natural language processing system assigning computing resources to the undesired performance actions, when those same computing resources could have otherwise been assigned to the desired performance of actions (e.g., actions that users in fact wanted the natural language processing system to perform).

This may be exacerbated when the undesired performance of actions results in the consumption of more computing resources than those consumed by the desired performance of actions. For example, data, needed by a natural language processing system to perform actions, may not be available to the natural language processing system at a time when the natural language processing system is undesirably triggered to perform the actions. When this occurs, an attempt by the natural language processing system to perform the action may result in one or more error conditions (with an error condition representing a process could not be performed to completion, for example due to processing "timing out"). The natural language processing system may, in at least some examples, be configured to re-attempt processing when an error condition exists. This re-processing to perform actions that are not desired by a user to be performed results in the increased consumption of computing resources over consumption expected to be used when the actions are desired to be performed (e.g., when processes performed to perform the actions, in the first instance, do not result in one or more error condition(s)).

The increased consumption of computing resources may additionally or alternatively be measured as a function of how often a set of multiple, related actions are performed over a predetermined period of time. Using the above example, a natural language processing system may perform a plurality of actions in response to a signal received from a sensor. At some point, the sensor may malfunction. Such malfunctioning may involve the sensor periodically (e.g., once every couple of seconds, minutes, etc.) falsely detecting the presence of an individual. With each instance of false detection, the sensor may send a signal to the natural language processing system, and the natural language processing system may perform actions corresponding to the signal. The performance of the actions may never result in error conditions. But, each time the natural language processing system performs the actions, in response to a false detection, the natural language processing system is using computing results for undesired actions that could have otherwise been assigned to perform desired actions. The unbeneficial assignment of resources to perform undesired actions may cause latency in the performance of desired actions.

The present disclosure provides techniques for detecting the performance of undesired actions, as well as techniques for minimizing the performance of such undesired actions in the future. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to detect and mitigate the performance of actions at times when a user does not desire the actions be performed. Although the figures and discussion illustrate certain operational steps of the system 100 in a particular order, the steps described may be performed in a different order (as well as certain steps removed or added) without departing from the intent of the disclosure. As shown in FIG. 1, the system 100 may include a device 110 (local to a user 5), a sensor 112, and a natural language processing system 120 connected across one or more networks 199. Various types of sensor 112s are envisioned by the present disclosure. A non-limiting list of possible sensor 112s includes a motion sensor, a proximity sensor, a wearable device (e.g., a smart watch), a device that measures a user's glucose level, a device that measures a user's blood pressure, an electronic thermometer, a device configured to indicate when a window is open/closed, a device configured to indicate when a door is open/closed, a carbon monoxide detector, a light sensor, a moisture sensor, an appliance (e.g., stove) sensor, a sensor that indicates when a fridge, cabinet, etc. is out of a particular item (e.g., eggs, laundry detergent, etc.), a wind meter, a camera, a microphone, a touch panel, etc.

In at least some examples, the device 110 may receive a natural language user input representing a plurality of actions are to be performed. For example, the device 110 may receive audio representing speech of the user, with the speech representing the plurality of actions are to be performed. The device 110 may send, to the natural language processing system 120, audio data representing the speech. In at least some other examples, the sensor 112 may detect a stimulus. For example, the sensor 112 may be a motion sensor configured to detect the presence of an individual. The sensor 112 may send, to the natural language processing system 120, data representing an individual has been detected.

The natural language processing system 120 may receive (150) first data (e.g., audio data from the device 110, data from the sensor 112, etc.) representing the plurality of actions are to be performed. In the example where the natural language processing system 120 receives audio data from the device 110, the natural language processing system 120 may perform speech processing with respect to the audio data to generate NLU results data, and may determine the NLU results data represent a plurality of actions are to be performed. In the example where the natural language processing system 120 receives data from the sensor 112, the natural language processing system 120 may determine, in a table, that the data corresponds to a plurality of actions to be performed. For example, first data may be sent from a motion sensor when the motion sensor detects an individual. For further example, first data may be sent from a proximity sensor when a user comes within a certain distance of the proximity sensor. In another example, first data may be sent from a device that measures a user's glucose level when the user's glucose level falls below a first value and/or exceeds a second value. In yet another example, first data may be sent from a device that measures a user's blood pressure when the user's blood pressure falls below a first value and/or exceeds a second value.

The natural language processing system 120 may determine (152) an identifier corresponding to the plurality of actions to be performed. The natural language processing system 120 may thereafter determine (154) an execution history corresponding to the identifier. The execution history may represent previous instances when the natural language processing system 120 received data representing the plurality of actions were to be performed. In at least some examples, the natural language processing system 120 may determine a subset (e.g., corresponding to the past 5 days) of an entirety of the execution history corresponding to the identifier.

The natural language processing system 120 may determine (156), based on the execution history, that the plurality of actions should not be performed. Such determination may be based on, for example, the execution history representing the plurality of actions were executed at least a threshold number of times within predetermined duration of time (e.g., were executed with at least a threshold frequency).

Thereafter, the natural language processing system 120 may represent (158) the identifier, corresponding to the plurality of actions, in a list of identifiers, corresponding to sets of pluralities of actions, not to be performed. The natural language processing system 120 may notify (160) the user of such. For example, the natural language processing system 120 may generate synthesized speech representing the plurality of actions will not be performed (and alternatively representing a reason for not performing the plurality of actions). The natural language processing system 120 may send the synthesized speech to the device 110 for output as audio to the user 5. In at least some examples, the natural language processing system 120 may be configured such that the user 5 can override the determination that the plurality of actions should not be performed (step 156). Such override may be embodied as a spoken user input, a text based user input, a user selection of a virtual button displayed by a device 110, etc.

The present disclosure describes a plurality of actions being performed in response to a single natural language user input or signal from a sensor. One skilled in the art will appreciate that the teachings herein may also apply to situations where, for example, a single action is to be performed in response to a signal from a sensor.

Figure 2:
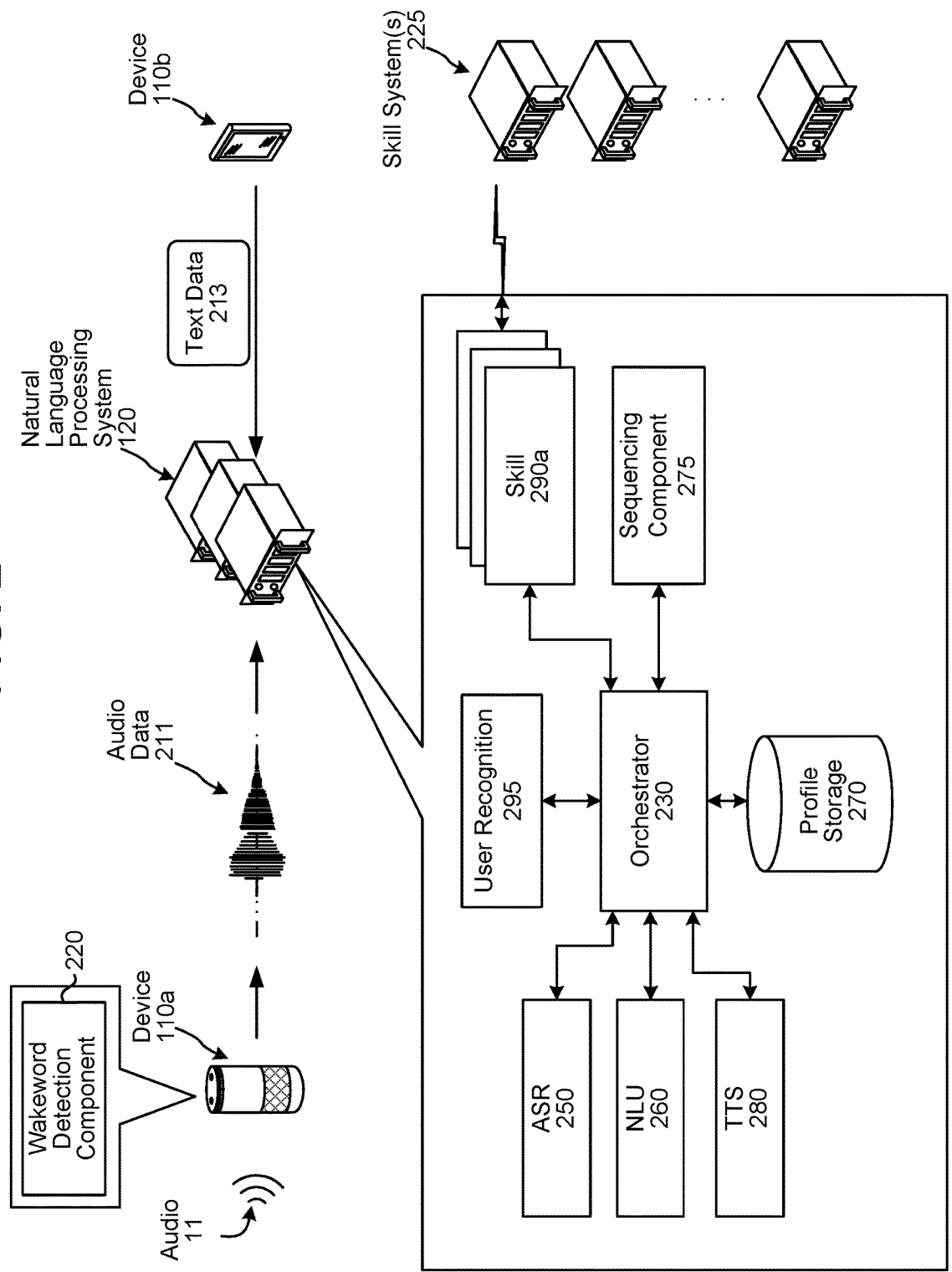
FIG. 2 is a conceptual diagram of components of a system, in accordance with embodiments of the present disclosure.

Further details of the system 100 configured to detect and mitigate the performance of actions, at times when a user does not desire the actions be performed, are explained below, following a discussion of the overall system 100 of FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the natural language processing system 120. An example wakeword is "Alexa."

As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the natural language processing system 120. The audio data 211 may include data corresponding to the wakeword, or the device 110a may remove the portion of the audio corresponding to the wakeword prior to sending the audio data 211 to the natural language processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based natural language user input. The device 110b may generate text data 213 representing the text-based natural language user input. The device 110a may send the text data 213 to the natural language processing system 120. The orchestrator component 230 may receive the text data 713.

A sensor (not illustrated) may send a signal to the orchestrator component 230. The orchestrator component 230 may identify, in storage, natural language text data associated with the signal.

The orchestrator component 230 may send text data (e.g., text data output by the ASR component 250, the received text data 213, or text data identified in storage as being associated with a particular signal) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the natural language processing system 120, a skill 290, a skill system 225, etc.) to execute the intent. For example, if the text data corresponds to "play Adele music," the NLU component 260 may determine an intent that the natural language processing system 120 output music and may identify "Adele" as an artist. For further example, if the text data corresponds to "what is the weather," the NLU component 260 may determine an intent that the natural language processing system 120 output weather information associated with a geographic location of the device 110. In another example, if the text data corresponds to "turn off the lights," the NLU component 260 may determine an intent that the natural language processing system 120 turn off lights associated with the device(s) 110 or the user(s) 5. The NLU component 260 may output NLU results data (which may include tagged text data, indicators of intent, etc.).

As described above, the natural language processing system 120 may perform speech processing using two different components (e.g., the ASR component 250 and the NLU component 260). One skilled in the art will appreciate that the natural language processing system 120, in at least some examples, may implement a spoken language understanding (SLU) component that is configured to process the audio data 211 to generate NLU results data.

In some examples, the SLU component may be equivalent to the ASR component 250 and the NLU component 260. For example, the SLU component may process the audio data 211 and generate NLU data. The NLU results data may include intent data and/or slot data. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take the audio data 211 representing natural language speech and attempt to make a semantic interpretation of the natural language speech. That is, the SLU component may determine a meaning associated with the natural language speech and then implement that meaning. For example, the SLU component may interpret the audio data 211 representing natural language speech from the user 5 in order to derive an intent or a desired action or operation from the user 5. In some examples, the SLU component outputs a most likely NLU hypothesis recognized in the audio data 211, or multiple NLU hypotheses in the form of a lattice or an N-best list with individual hypotheses corresponding to confidence scores or other scores (such as probability scores, etc.).

The natural language processing system 120 may include one or more skills. A skill 290 may be software running on the natural language processing system 120 that is akin to a software application running on a traditional computing device. That is, a skill 290 may enable the natural language processing system 120 to execute specific functionality in order to provide data or produce some other requested output. The natural language processing system 120 may be configured with more than one skill 290. For example, a weather service skill may enable the natural language processing system 120 to provide weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 290 may operate in conjunction between the natural language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the natural language processing system 120, a skill may be implemented by a skill system 225. Such may enable a skill system 225 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 290 dedicated to interacting with more than one skill system 225.

Unless expressly stated otherwise, reference herein to a "skill" may include a skill 290 operated by the natural language processing system 120 and/or a skill operated by a skill system 225. Moreover, the functionality described herein as a skill may be referred to using many different terms, such as an action, bot, app, or the like.

The natural language processing system 120 may include a TTS component 280. The TTS component 280 may generate audio data (e.g., synthesized speech) from text data using one or more different methods. Text data input to the TTS component 280 may come from a skill 290, a skill system 225, the orchestrator component 230, or another component of the natural language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include a user recognition component 295 that recognizes one or more users associated with data input to the natural language processing system 120. The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the natural language processing system 120 in correlation with a user input, to stored biometric data of users. The user recognition component 295 may additionally or alternatively perform user recognition by comparing image data (e.g., including a representation of at least a feature of a user), received by the natural language processing system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the natural language processing system 120 and/or other systems.

The natural language processing system 120 may include profile storage 270. The profile storage 270 may include a variety of information related to individual users, groups of users, devices, etc. that interact with the natural language processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 3:
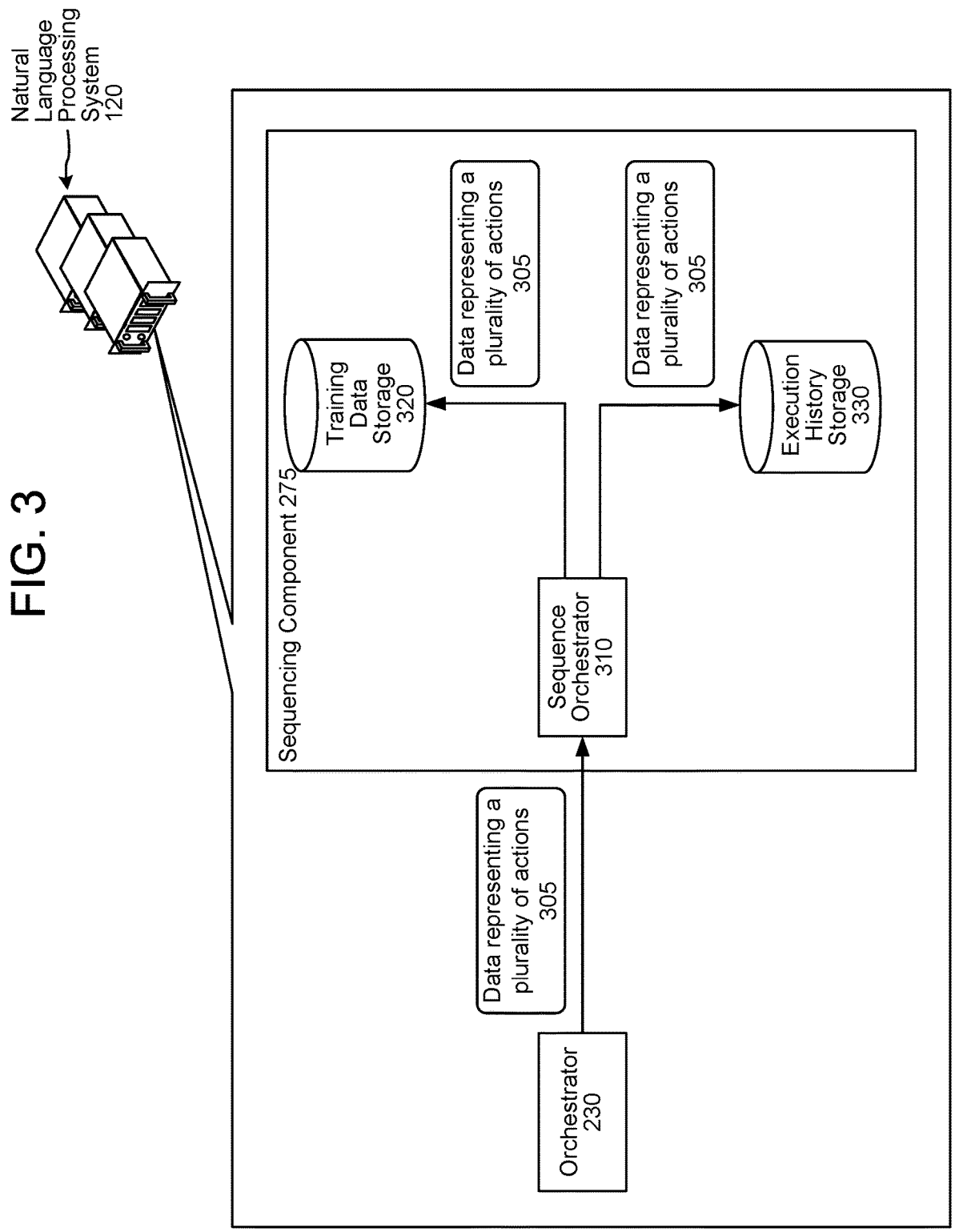
FIG. 3 is a conceptual diagram illustrating how a sequencing component may store data representing a plurality of actions to be performed, in accordance with embodiments of the present disclosure.

The natural language processing system 120 may include a sequencing component 275 configured to coordinate the performance of sets of pluralities of actions, as well as being configured to mitigate the unbeneficial performance of sets of pluralities of actions. As illustrated in FIG. 3, the orchestrator component 230 may send, to the sequencing component 275, data 305 representing a plurality of actions.

The data 305 may be generated in response to a user configuring the plurality of actions. For example, the user may provide the natural language processing system 120 with input representing the plurality of actions to be performed. Alternatively, the data 305 may be generated in response to a user confirming a suggestion output by the natural language processing system 120. For example, the natural language processing system 120 may determine a system usage history, associated with the user's identifier, represents the user routinely interacts with the natural language processing system 120 to perform a plurality of actions in a same or similar manner. Based on this, the natural language processing system 120 may output audio and/or text asking the user whether the natural language processing system 120 should associate the plurality of actions for purposes of performing the plurality of actions in response to a single further user input (or single instance of data received from a sensor in the future). If the user confirms, the natural language processing system 120 may generate the data 305. Alternatively, the data 305 may be generated in response to the natural language processing system 120 receiving data representing the plurality of actions is to be performed (as described above with respect to step 150).

The data 305 may include a semantic representation of each action of the plurality of actions. Additionally or alternatively, the data may include NLU results data (e.g., including tagged and slotted text data) for each action.

When received by the sequencing component 275, the data 305 may be sent to a sequence orchestrator component 310. The sequence orchestrator component 310 may cause the data 305 to be stored in one or more storages for purposes of performing one or more different runtime operations.

In at least some examples, the sequence orchestrator component 310 may cause the data 305 to be storage in a training data storage 320. The training data storage 320 may include data used to train one or more machine learning models implemented by the sequencing component 275 at runtime to determine whether a plurality of actions should be performed. The data, in the training data storage 320, may be processed offline to determine long-term patterns in which processing of a set of a plurality of actions resulted in an error condition(s) and/or in which processing of a set of a plurality of actions resulted in an unexpectedly high amount of computing resource consumption.

Various machine learning techniques may be used to train and operate models to perform various steps described herein, such as determining whether a plurality of actions should be performed. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and authentication patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In at least some examples, the sequence orchestrator component 310 may cause the data 305 to be storage in an execution history storage 330. The execution history storage 330 may include data used to determine, using one or more rules at runtime, whether a plurality of actions should be performed.

FIG. 4 is an example of the types of data that may be stored and associated in the training data storage 320 and/or the execution history storage 330. The types of data stored in the training data storage 320 may be the same as the types of data stored in the execution history storage 330. A difference between the training data storage 320 and the execution history storage 330 may be that the training data storage 320 may include more data than the execution history storage. For example, the execution history storage 330 may only store data 305 corresponding to timestamps relating to a predetermined past period of time (e.g., the past week, the past month, etc.), whereas the training data storage 320 may include data corresponding to timestamps relating to the predetermined past period of time as well as corresponding to times occurring prior to the predetermined past period of time. One skilled in the art will appreciate that, the more data stored by the training data storage 320, the more accurate of a model(s) that may be generated.

One skilled in the art will appreciate that, since the training data storage 320 and the execution history storage 330 may include the same kinds of data, the data stored in the training data storage 320 could conceivably be used at runtime to evaluate one or more rules for determining whether a plurality of actions should be performed. By implementing the execution history storage 330 for evaluating the one or more rules (e.g., by limiting the amount of data needed to be evaluated against the one or more rules at runtime), latency caused by the rule(s) evaluation may be decreased (e.g., due to decreasing an amount of time needed to recall relevant data from storage for processing).

FIG. 4 illustrates how data, corresponding to a single plurality of actions may be stored in the training data storage 320 and/or the execution history storage 330. One skilled in the art will appreciate that the training data storage 320 and/or the execution history storage 330 may include the illustrated types of data for various instances in which the natural language processing system 120 is queried to execute a plurality of actions.

As illustrated in FIG. 4, each instance of a plurality of actions, represented in the training data storage 320 and/or the execution history storage 330, may include a profile identifier (corresponding to a profile of the user), an identifier specific to the plurality of actions, and a trigger for the plurality of actions. As illustrated, a trigger may be data from a sensor representing an individual is detected. One skilled in the art will appreciate that various triggers may be used. For example, a trigger may alternatively be a spoken natural language user input, a text-based natural language user input, an indication representing a user has interacted with a button (e.g., a button displayed on a screen of a device 110), etc.

Each instance of a plurality of actions, represented in the training data storage 320 and/or the execution history storage 330, may include data representing the plurality of actions. As illustrated, an action may be represented by text corresponding to a semantic representation of the action. Alternatively, an action may be represented by NLU results data (e.g., tagged and slotted text, intent indicator, etc.) representing the action.

Each instance of a plurality of actions, represented in the training data storage 320 and/or the execution history storage 330, may include, for each action, a timestamp when processing with respect to performance of the action began, and data representing a duration of the processing of the action. Each instance of a plurality of actions, represented in the training data storage 320 and/or the execution history storage 330, may include, for each action, a resource invoked to perform the action and a status of the resource's processing. Each instance of a plurality of actions, represented in the training data storage 320 and/or the execution history storage 330, may include a status (e.g., completed, in progress, timed out) representing processing of the plurality of actions.

The status of an action may be received in various manners. Using the data in FIG. 4 as an example, a smart home skill (e.g., a skill corresponding to a smart home domain) may, in response to receiving data representing the smart light is to be turned on, send, to the smart light, a directive to "turn on." In response, the smart light may try to "turn on." In response to receiving the directive, the smart light may send, to the smart home skill, an indication that the action (i.e., turning on the smart light) is in progress. The smart home skill may send the indication to the sequence orchestrator component 310, which may cause, in the training data storage 320 and or execution history storage 330, the "action status" for "turn on smart light" to be "InProgress." If the smart light is successful at turning on, the smart light may, send, to the smart home skill, an indication that the action was completed. The smart home skill may send the indication to the sequence orchestrator component 310, which may cause, in the training data storage 320 and/or execution history storage 330, the "action status" for "turn on smart light" to be "Completed." If the smart home skill does not receive, from the smart light within a predetermined amount of time, an indication that the action was completed, the smart home skill may send, to the sequence orchestrator component 310, a "TimedOut" action status. The sequence orchestrator component 310 may in turn cause, in the training data storage 320 and/or execution history storage 330, the "action status" for "turn on smart light" to be "TimedOut." One skilled in the art will appreciate how to apply the foregoing to different actions and devices.

Figure 5:
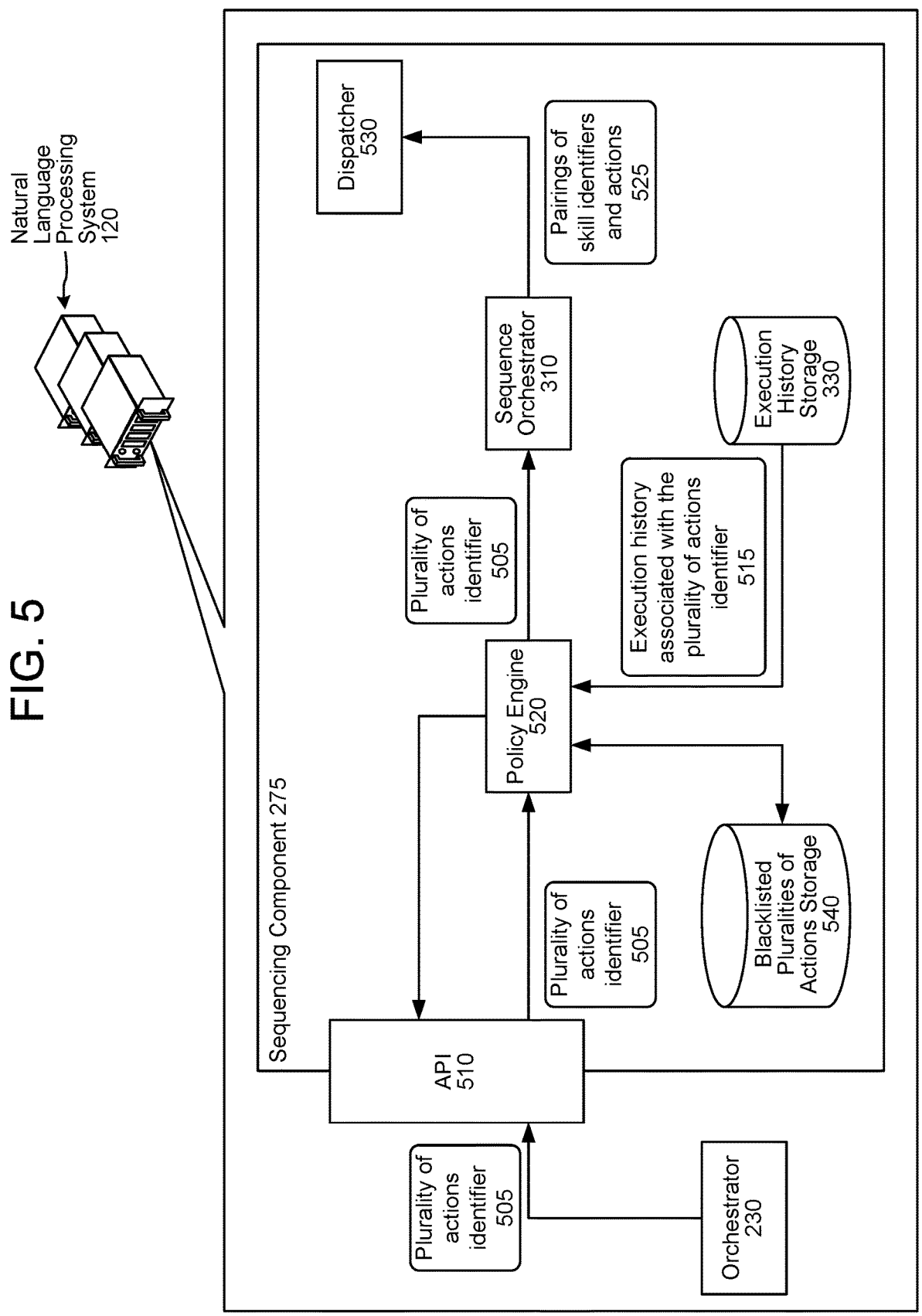
FIG. 5 is a conceptual diagram illustrating how the sequencing component may be invoked to perform a plurality of actions, in accordance with embodiments of the present disclosure.

FIG. 5 illustrates how the sequencing component 275 may be invoked to perform a plurality of actions. Once the orchestrator component 230 (or other component of the natural language processing system 120) determines data representing a plurality of actions is to be performed (e.g., determines a natural language user input represents a plurality of actions is to be performed; determines data, received from a sensor, represents a plurality of actions is to be performed; receives, from a skill, data representing a plurality of actions are to be performed; etc.), the orchestrator component 230 (or other component of the natural language processing system 120) may determine an identifier 505 corresponding to the plurality of actions to be performed. The natural language processing system 120 may include a storage including identifiers corresponding to respective pluralities of actions to be performed. The orchestrator component 230 (or other component of the natural language processing system 120) may determine the identifier 505 in the storage.

The orchestrator component 230 (or another component of the natural language processing system 120) may send the identifier 505 to an application program interface (API) 510 of the sequencing component 275. The API 510 may determine the received data corresponds to an identifier of a plurality of actions and, in turn, forward the identifier 505 to a policy engine 520. The policy engine 520 may be configured to perform various processing to ensure the plurality of actions are intended to be performed by a user.

The policy engine 520 may communicate with a storage 540 storing identifiers of pluralities of actions that were not intended to be performed by users. The policy engine 520 may query the storage 540 to determine whether the identifier 505 is represented in the storage 540. If the policy engine 520 determines the identifier 505 is represented in the storage 540, the policy engine 520 may cease processing with respect to the plurality of actions corresponding to the identifier 505. If the policy engine 520 determines the identifier 505 is not represented in the storage 540, the policy engine 520 may continue processing with respect to the plurality of actions as described below.

The policy engine 520 may communicate with the execution history storage 330. More particularly, the policy engine 520 may receive, from the execution history storage 330, an execution history 515 associated with the identifier 505. The execution history 515 may represent one or more instances of the types of data illustrated in FIG. 4. If, as described, the execution history storage 330 is configured to include data from only a predetermined past period of time, the policy engine 520 may query the execution history storage 330 for all data stored in the execution history storage 330 corresponding to the identifier 505. If the execution history storage 330 is not so configured, the policy engine 520 may query the execution history storage 330 for data that is associated with the identifier 505 and corresponds to timestamps within the predetermined past period of time.

The policy engine 520 may determine whether the plurality of actions should be performed based on a frequency with which the plurality of actions were performed in the execution history 515. The policy engine 520 may determine whether the execution history 515 indicates the plurality of actions were performed at least a number of times within a past predetermined period of time. The past predetermined period of time may correspond to an entirety of the duration of the timestamps in the execution history 515. Alternatively, the past predetermined period of time may correspond to a subset of the timestamps in the execution history 515. For example, the timestamps in the execution history 515 may correspond to a most recent past 10 minutes, but the past predetermined period of time may correspond to a most recent past 2 minutes. If the policy engine 520 determines the plurality of actions were performed at least the number of times within the past predetermined period of time, the policy engine 520 may cause the identifier 505, corresponding to the plurality of actions, to be represented in the storage 540 (thereby preventing the plurality of actions from being performed in the future).

The policy engine 520 may additionally or alternatively determine whether the plurality of actions should be performed based on whether the execution history 515 indicates the plurality of actions resulted in "timed out" conditions. If the policy engine 520 determines the execution history 515 indicates processing of the plurality of actions timed out, the policy engine 520 may cause the identifier 505, corresponding to the plurality of actions, to be represented in the storage 540.

In at least some examples, the policy engine 520 may determine whether the plurality of actions should be performed based on a frequency with which processing of the plurality of actions timed out. The policy engine 520 may determine whether the execution history 515 indicates processing of the plurality of actions timed out at least a number of times within a past predetermined period of time. The past predetermined period of time may correspond to an entirety of the duration of the timestamps in the execution history 515. Alternatively, the past predetermined period of time may correspond to a subset of the timestamps in the execution history 515. If the policy engine 520 determines processing of the plurality of timed out at least the number of times within the past predetermined period of time, the policy engine 520 may cause the identifier 505, corresponding to the plurality of actions, to be represented in the storage 540.

The policy engine 520 may additionally or alternatively determine whether the plurality of actions should be performed based on whether the plurality of actions are currently being performed (or one or more skills are currently processing to perform the one or more actions). The execution history storage 330 (or another storage) may include data representing pluralities of actions that are currently being processed. For example, with reference to FIG. 4, for a plurality of actions that are currently being processed, the "plurality of actions status" may be represented as "InProgress." The policy engine 520 may determine whether the execution history 515 represents processing is currently being performed by a skill(s) (or by a device such as, for example, a smart light) with respect to the plurality of actions. If the policy engine 520 determines the execution history 515 represents processing is currently being performed with respect to the plurality of actions, the policy engine 520 may cause the identifier 505, corresponding to the plurality of actions, to be represented in the storage 540.

The policy engine 520 may additionally or alternatively determine whether the plurality of actions should be performed based on whether results of processing, performed by one or more skills, conform to the plurality of actions. As described with respect to FIG. 4, the execution history storage 330 may store semantic representations and/or NLU results data corresponding to an action. After processing is performed with respect to an action (e.g., by a skill or by a device such as a smart light), the execution history storage 330 may be updated to represent results of the processing performed for the action. The policy engine 520 may be able to predict the results of processing for an action based on the semantic representation and/or NLU results data associated with the action. The policy engine 520 may determine whether results of processing, represented in the execution history 515, do not conform to results predicted by the policy engine 520. If the policy engine 520 determines results of processing, represented in the execution history 515, do not conform to results predicted by the policy engine 520, the policy engine 520 may cause the identifier 505, corresponding to the plurality of actions, to be represented in the storage 540.

The policy engine 520 may additionally or alternatively determine whether the plurality of actions should be performed based on whether the plurality of actions correspond to a different plurality of actions already stored in the storage 540. For example, the storage 540 may include the identifier of a plurality of actions whose processing timed out in the past, or resulted in unexpected results in the past. The policy engine 520 may determine the plurality of actions, corresponding to the identifier 505 in the execution history storage 330, includes at least a threshold number of actions (and optionally determines the at least a threshold number of actions are to be performed in a same sequence as) actions of a plurality of actions represented in the storage 540. In at least some examples, the threshold number of actions may be configured based on a success rate of previous executions of the plurality of actions. If the policy engine 520 determines the plurality of actions, corresponding to the identifier 505, includes at least a threshold number of actions (and optionally determines the at least a threshold number of actions are to be performed in a same sequence as actions of a plurality of actions represented in the storage 540), the policy engine 520 may cause the identifier 505 to be represented in the storage 540 as well. The plurality of actions, corresponding to the identifier 505, and the plurality of actions, previously resulting in error conditions, may corresponding to different profile identifiers (e.g., may correspond to different users of the natural language processing system 120.

In at least some examples, the foregoing processes of the policy engine 520 may be implemented as one or more rules. In at least some other examples, the foregoing processes may be performed by a machine learned model(s).

Implementing one or more machine learned model(s) may enable the policy engine 520 to perform more intelligent decision making. For example, the policy engine 520 may determine a plurality of actions includes the output of music, at a relatively loud volume, in response to a sensor detecting the presence of an individual entering a house. The policy engine 520 may determine an execution history, for the plurality of actions, indicates the plurality of actions have traditionally been triggered to be performed at a certain time of day (e.g., when the user returns home from work around 6 pm). Based on this, if the policy engine 520 receives the identifier 505 at a different time (e.g., a sensor falsely triggers the plurality of actions to occur at 3 am), the policy engine 520 may prevent the plurality of actions from being performed.

After the policy engine 520 stores the identifier 505 in the storage 540, the sequencing component 275 may cause data, representing such storage, to be output to the user. In response to receiving the data, the user may cause the sequencing component 275 to remove the identifier 305 from the storage 540, thereby permitting the plurality of actions, corresponding to the identifier 505, to again be performed. For example, a user may cause the identifier 505 to be removed from the storage 540 in situations where the user wants the plurality of actions to be performed more frequently that the policy engine 520's processing permits. This is different from at least some processing throttling systems, in which a user is unable to override throttling decisions made by the system. In addition to removing the identifier 505 from the storage 540, the sequencing component 275 may associate the identifier 505 with another identifier (e.g., flag) representing the identifier 505 is not to be stored in the storage 540 in the future. Prior to associating the flag with the identifier 505, the policy engine 520 may perform one or more validations to confirm the user, that caused the identifier 505 to be removed from the storage 540, was authorized to cause such processing. Such validations may include, for example, confirming the user is not identified as a spam user by the natural language processing system 120.

If the policy engine 520 does not determine the identifier 505 should be represented in the storage 540 (in other words, if the policy engine 520 does not determine the plurality of actions should not be performed), the policy engine 520 may send, to the sequence orchestrator 310, the identifier 505 and/or semantic representations/NLU results data corresponding to plurality of actions corresponding to the identifier 305.

The sequence orchestrator component 310 may determine, for each action of the plurality of actions, a skill identifier corresponding to a skill to be invoked to process with respect to the action. If the sequence orchestrator 310 simply receives the identifier 505 from the policy engine 520, the sequence orchestrator component 310 may query the execution history storage 330 for semantic representations and/or NLU results data corresponding to the identifier 505. The sequence orchestrator component 310 may send, to a dispatcher component 530, semantic representations and/or NLU results data representing the plurality of actions to be performed.

The dispatcher component 530 may be configured to, using the semantic representations and/or NLU results data, determine, for each of the plurality of actions, a skill to be invoked to perform the action. The dispatcher component 530 may call each skill determined the dispatcher component 530 determines should be invoked (e.g., send, to each skill, NLU results data corresponding to the action the skill is to perform). If the dispatcher component 530 receives a semantic representation of an action with NLU results data representing the semantic representation, the dispatcher component 530 may send the semantic representation (e.g., text data) to the NLU component 260, which may return NLU results data for the semantic representation to the dispatcher component 530. The dispatcher component 530 may communicate with the NLU component 260 with or without the sequence orchestrator component 310 acting as an intermediary.

One skilled in the art will appreciate that actions, of a plurality of actions, may be processed by skills in parallel, or may need to be processed by skills in series. For example, actions may need to be processed in series if first NLU results data, to be sent to a first skill, need to include data output from the processing of second NLU results data by a second skill. The dispatcher component 530 may be configured to determine whether actions may be processed in parallel or need to be processed in series, and may send NLU results data to skills in conformance with such determination.

Each skill may provide an operation status reporting API (which may be configured as part of the sequencing component 275 or another component of the natural language processing system 120) with a status (e.g., completed, failed, etc.) representing a result of the skill's processing. This status may be associated with an appropriate action and timestamp in the execution history storage 330. In order to enable such processing and storage, the dispatcher component 530 may send, to skills, the identifier 505 in addition to NLU results data. When a skill sends the status to the operation status reporting API, the skill may also send the identifier 505. The sequencing component 275 (and more particularly the sequence orchestrator 310) may thereafter identify the plurality of actions in the execution history storage 330 using the identifier 505, determine which action is associated with the skill identifier of the skill, and update the status of the action.

Figure 6:
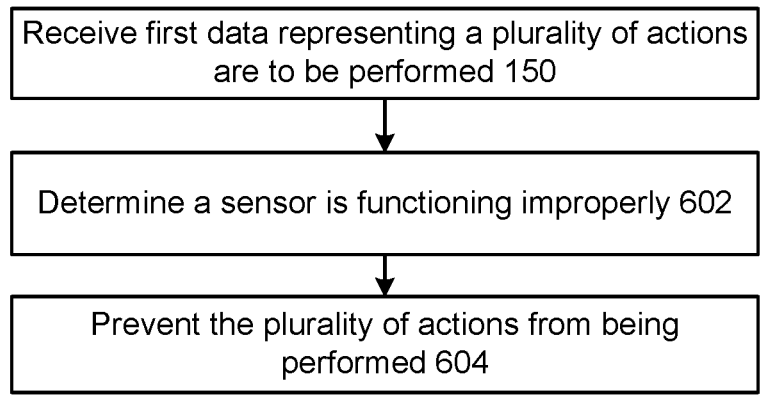
FIG. 6 is a flow diagram illustrating how a system may detect and mitigate the performance of actions, in accordance with embodiments of the present disclosure.

FIG. 6 illustrates a method of how a system 100 may detect and mitigate the performance of actions. The natural language processing system 120 may receive (150) first data representing a plurality of actions are to be performed.

In situations wherein the first data was generated from a sensor 112, the natural language processing system 120 may thereafter determine (602) the sensor 112 is functioning improperly. Various determinations may underlie the natural language processing system 120's determination that the sensor 112 is functioning improperly. In at least some examples, a sensor 112 may function improperly based on a hacker causing the sensor 112 to perform improperly.

For example, the natural language processing system 120 may determine the sensor 112 is functioning improperly based on, as described herein, an execution history associated with the plurality of actions. Additionally or alternatively, the natural language processing system 120 may determine the sensor 112 is functioning improperly based on a time when the first data was generated and/or received. For example, the natural language processing system 120 may determine the plurality of actions includes the output of music, at a relatively loud volume. The natural language processing system 120 may determine execution histories associated with various users of the natural language processing system 120, and may determine the execution histories indicate users typically cause music to be output at the loud volume during the day. The natural language processing system 120 may determine that the first data was generated and/or received at night. Based on users typically causing music to be output at the loud volume during the day and based on the first data being generated and/or received during the night, the natural language processing system 120 may determine the sensor is functionality improperly.

For example, the sensor 112 may be an electronic thermometer configured to measure the temperature of a user or the temperature of an environment surrounding the thermometer. The electronic thermometer may be configured to output a signal, corresponding to a plurality of actions, when the electronic thermometer determines a temperature above a threshold temperature. The signal may also include the determined temperature. At some point, the electronic thermometer may output a signal representing an unusually high temperature (e.g., 200° F.). The natural language processing system 120 may determine, based on the signal representing the unusually high temperature, that the thermometer is functioning improperly.

For further example, the sensor 112 may be configured to indicate when a window is open/closed. The sensor 112 may be configured to output a signal, corresponding to a plurality of actions, when the sensor 112 determines the window was recently closed. At some point, the sensor 112 may output a signal representing the window was recently closed. The natural language processing system 120 may receive image data from a camera, whereby the image data shows the window. The natural language processing system 120 may determine the image data shows the window as being open. Based on the image data showing the window as being open but the signal representing the window as being recently closed, the natural language processing system 120 may determine the sensor 112 is functioning improperly. The same type of processing may be performed in response to the sensor 112 outputting a signal representing the window was recently opened. Moreover, the same type of processing may be performed with respect to a sensor 112 that is configured to indicate when a door, rather than a window, is open/closed.

In another example, the sensor 112 may be a wind meter. The wind meter may be configured to output a signal, corresponding to a plurality of actions, when the wind meter determines a wind strength of a certain magnitude (e.g., corresponding to a serious weather event such as a tornado). At some point, the wind meter may output a signal representing a wind strength of a certain magnitude. The natural language processing system 120 may receive weather data from a weather skill, whereby the weather data represents weather conditions corresponding to the wind meter. The natural language processing system 120 may determine the weather data represents the wind meter is experiencing a wind strength well below the certain magnitude. Based on the weather data representing the wind strength is well below the certain magnitude but the signal representing the wind strength is at or above the certain magnitude, the natural language processing system 120 may determine the wind meter is functioning improperly.

Based on determine the sensor 112 is functioning improperly, the natural language processing system 120 may prevent (604) the plurality of actions from being performed.

The natural language processing system 120 may prevent all actions, of the plurality of actions, from being performed. Alternatively, the natural language processing system 120 may prevent only a subset of the plurality of actions from being performed. Using the above as an example, the plurality of actions may include outputting music at a loud volume in addition to outputting the present time and weather information. The natural language processing system 120, in the above example, may prevent the music from being output but nonetheless may still permit the present time and/or weather information to be output.

In at least some examples, the processing performed with respect to FIG. 6 may be performed during offline operations. For example, the natural language processing system 120 may determine an execution history for a plurality of actions triggered by a sensor 112, determine the sensor 112 is functioning improperly, and prevent the future performance of the plurality of actions. To prevent the future performance, the natural language processing system 120 may store an identifier corresponding to the plurality of actions, and optionally other information, in the blacklisted pluralities of actions storage 540.

In at least some examples, a user may create conflicting routines. For example, a user may create a first routine representing a smart lock of a door is to be locked in response to a first trigger, and a second routine representing the smart lock is to be unlocked in response to a second trigger. In at least some examples, the first and second triggers may be received simultaneously (or nearly simultaneously) such that the natural language processing system is directed to both lock the smart lock as well as unlock the smart lock. The system, for example using policy engine 520, may determine that a conflict exists between routines and may send an indication of such to a user device requesting that an edit be made to one or more of the conflicting routines. The system may also determine a conflict at runtime when both routines attempt to operate at or near the same time. The system may then send a prompt to the user to select which action/routine to perform or may select one action/routine based on information available to the system. The system may, for example using the policy engine 520, determine that a certain routine more closely aligns with user execution history 515 and may allow that routine to proceed while cancelling the other routine.

The system may also determine if a user created routine conflicts with the user execution history 515. For example if the routine calls for execution of an action that is contrary to the user's history the system may send a prompt to the user to select which action to perform (either the one associated with the history or the one associate with the routine) or may select an action based on information available to the system.

As an example, a user may ask the system to perform a routine at 9:30 pm that involves opening the blinds, starting a coffee machine and turning on the kitchen lights. The system, for example the policy engine 520, may determine that user history indicates that at 9:30 pm blinds are typically closed, the coffee machine is typically off and the kitchen lights are typically off. The system may then prompt the user (with audio, text, and/or images, etc.) along the lines of "you have set a routine for 9:30 pm that is different from what you normally do. Are you sure you want to do this?" along with information about the conflicting actions. If the user says yes the system may override the user history to enable the requested routine. If the user says no (for example then changes the routine to 9:30 am) the system may cancel the originally requested routine (and perhaps enable the altered routine).

Figure 7:
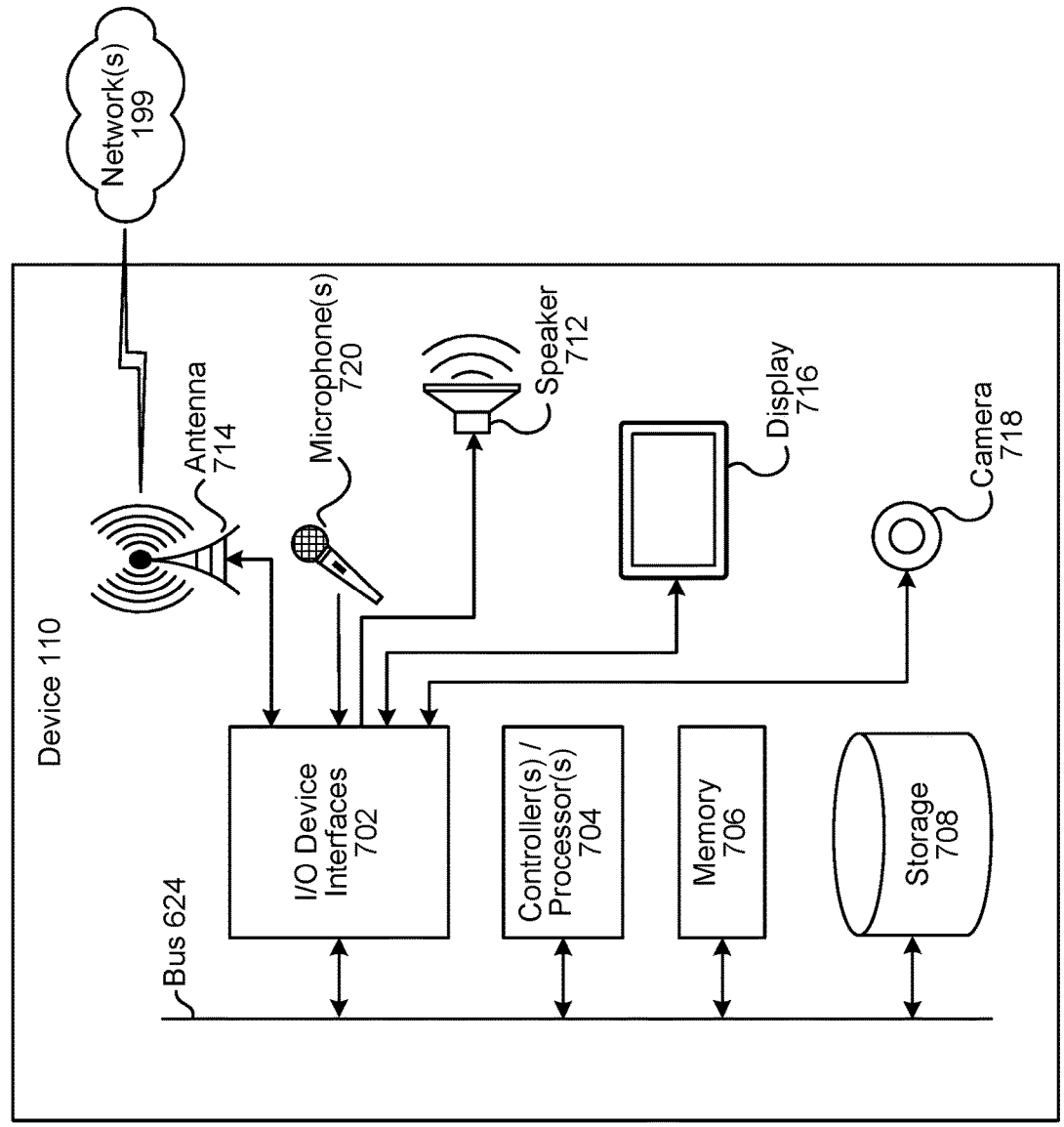
FIG. 7 is a block diagram conceptually illustrating example components of a device, in accordance with embodiments of the present disclosure.
Figure 8:
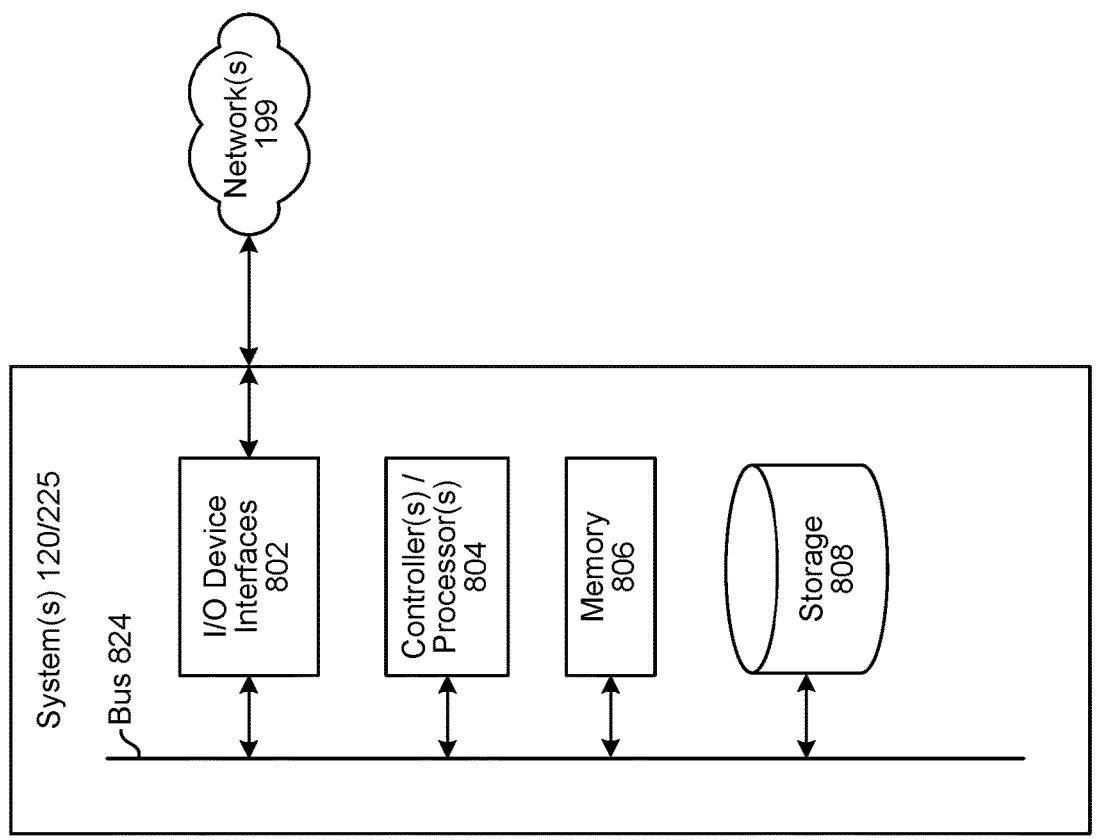
FIG. 8 is a block diagram conceptually illustrating example components of a system, in accordance with embodiments of the present disclosure.

FIG. 7 is a block diagram conceptually illustrating a device 110/112 that may be used with the system. FIG. 8 is a block diagram conceptually illustrating example components of a remote device, such as the natural language processing system 120, which may assist with ASR processing, NLU processing, etc., and a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system 100 of the present disclosure, such as one or more natural language processing systems 120 for performing ASR processing, one or more natural language processing systems 120 for performing NLU processing, one or more skill systems 225, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (702/802).

Computer instructions for operating each device (110/120/225) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225) includes input/output device interfaces (702/802). A variety of components may be connected through the input/output device interfaces (702/802), as will be discussed further below. Additionally, each device (110/120/225) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the natural language processing system 120, or a skill system 225 may include their own dedicated processors, memory, and/or storage. Alternatively, one or more of the components of the device(s) 110, the natural language processing system 120, or a skill system 225 may utilize the I/O interfaces (702/802), processor(s) (704/804), memory (706/806), and/or storage (708/808) of the device(s) 110, natural language processing system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 225, as described herein, are illustrative, and may be located as a stand-alone device or may be included, in whole or in part, as a component of a larger device or system.

Figure 9:
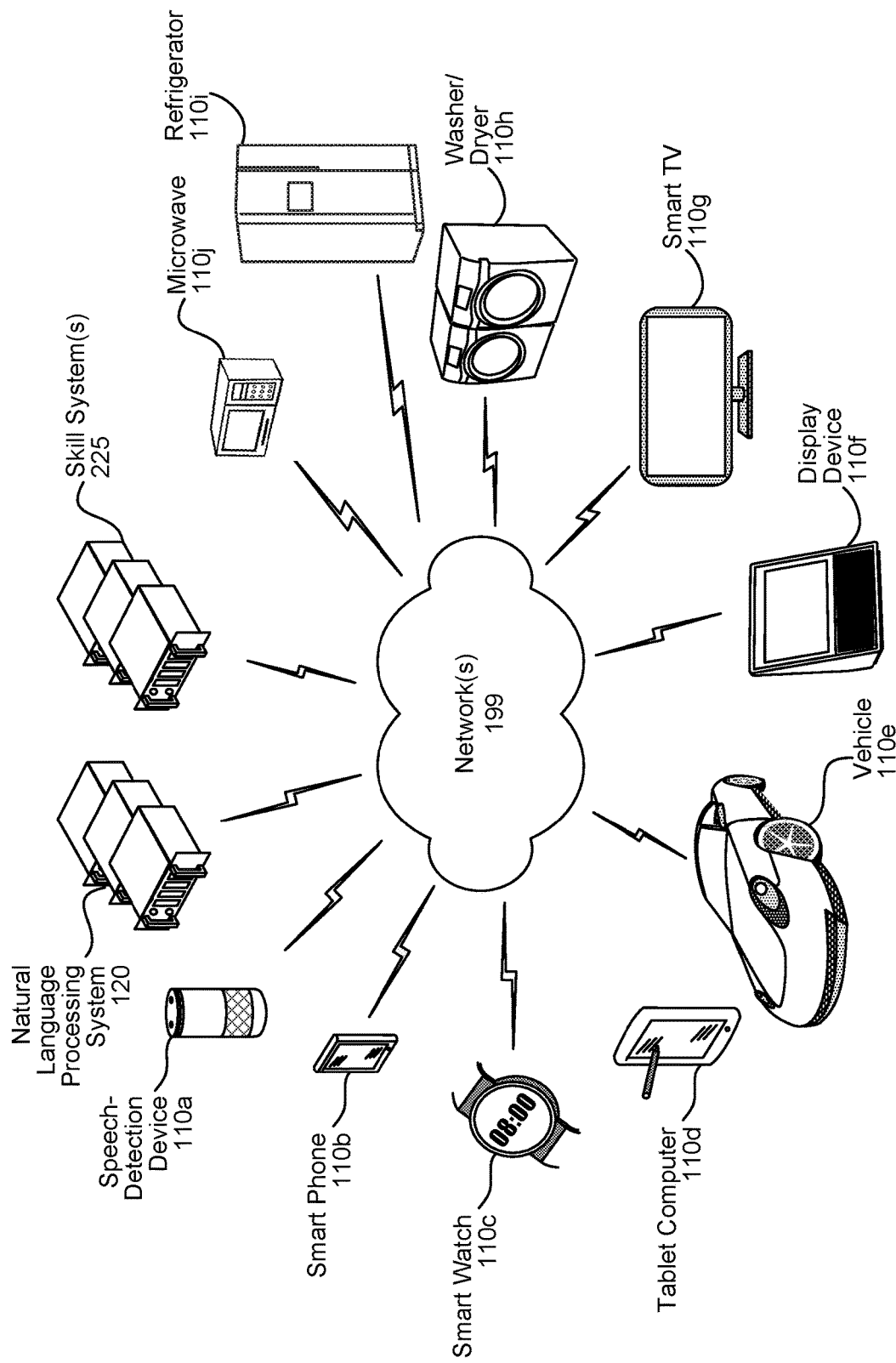
FIG. 9 illustrates an example of a computer network for use with the overall system, in accordance with embodiments of the present disclosure.

As illustrated in FIG. 9, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a motion sensor, a signal representing a human was detected;
determining a routine identifier corresponding to the signal, the routine identifier representing a first action performable by a backend system;
determining an execution history associated with the routine identifier, the execution history representing previous instances in which processing was performed with respect to the first action;
determining, in the execution history, a number of times processing of the first action resulted in a timed out status;
determining the number of times meets or exceeds a threshold number of times;
based at least in part on determining the number of times meets or exceeds the threshold number of times, determining the first action to be prevented from being performed; and
after determining the first action is to be prevented from being performed, storing the routine identifier in storage, wherein the storing prevents the backend system from performing processing with respect to the first action in response to the signal being received.

2. The method of claim 1, further comprising:
sending, to a first device corresponding to the first action, a directive to perform the first action;
receiving, from the first device, a first indicator representing processing of the first action is in progress;
storing a first association between the first indicator and the first action;
after receiving the first indicator, receiving, from the first device, a second indicator representing processing of the first action timed out; and
storing a second association between a first time out indicator and the first action,
wherein the second association is represented in the execution history.

3. The method of claim 1, further comprising:
determining, in the execution history, first data representing a most recent instance when the backend system processed with respect to the first action;
determining the first data represents the backend system is currently processing with respect to the first action; and after determining the first data represents the backend system is currently processing with respect to the first action, storing the routine identifier.

4. The method of claim 1, further comprising:
determining, in the execution history, natural language understanding (NLU) results data corresponding to the first action;
determining a predicted result of processing performed with respect to the NLU results data;
determining, in the execution history, a first result of processing performed with respect to the NLU results data;
determining the predicted result is different from the first result; and
after determining the predicted result is different from the first result, storing the routine identifier.

5. A system, comprising:
at least one processor; and
at least one memory comprising instructions that, when executed by the at least one processor, cause the system to:
receive first data representing a first set of actions are to be performed, the first set of actions comprising:
a first action performable by a first component that receives an input from a natural language processing system, and
a second action;
determine an execution history representing previous instances in which processing was performed with respect to the first set of actions;
determine, using the execution history, a first frequency with which processing of the first set of actions resulted in a timed out status; and
based at least in part on the first frequency, cease processing with respect to the first set of actions.

6. The system of claim 5, wherein the at least one memory further comprises instructions that, when executed by the at least one processor, further cause the system to:
send, to the first component, a directive to perform the first action;
receive, from the first component, an indicator representing processing of the first action timed out; and
store an association between the first set of actions and the indicator,
wherein determining the first frequency is based at least in part on the association.

7. The system of claim 6, wherein the first data is received from a sensor and wherein the at least one memory further comprises instructions that, when executed by the at least one processor, further cause the system to:
determine, based at least in part on the first frequency, that the sensor is functioning improperly.

8. The system of claim 5, wherein the at least one memory further comprises instructions that, when executed by the at least one processor, further cause the system to:
determine, in the execution history, second data representing a most recent instance when the first component performed processing with respect to the first action;
determine the second data represents the first component is currently performing the processing with respect to the first action; and
cease processing, with respect to the first set of actions, further based at least in part on the second data representing the first component is currently performing the processing with respect to the first action.

9. The system of claim 5, wherein the at least one memory further comprises instructions that, when executed by the at least one processor, further cause the system to:
determine, in the execution history, natural language understanding (NLU) results data corresponding to the first action;
determine a predicted result of processing performed with respect to the NLU results data;
determine, in the execution history, a first result of the processing performed with respect to the NLU results data;
determine the predicted result is different from the first result; and
cease processing, with respect to the first set of actions, further based at least in part on the predicted result being different from the first result.

10. The system of claim 5, wherein the at least one memory further comprises instructions that, when executed by the at least one processor, further cause the system to:
determine a second set of actions previously prevented from being executed;
determine the first set of actions corresponds to the second set of actions; and
cease processing, with respect to the first set of actions, further based at least in part on the first set of actions corresponding to the second set of actions.

11. The system of claim 10, wherein:
the first set of actions corresponds to a first profile identifier; and
the second set of actions corresponds to a second profile identifier.

12. The system of claim 5, wherein the at least one memory further comprises instructions that, when executed by the at least one processor, further cause the system to:
receive second data representing the first set of actions are to be performed;
determine a subset of the first set of actions is to be performed; and
based at least in part on determining the subset is to be performed, cause the first action to be performed.

13. A method, comprising:
receiving first data representing a first set of actions are to be performed, the first set of actions comprising:
a first action performable by a first component that receives an input from a natural language processing system, and
a second action;
determining an execution history representing previous instances in which processing was performed with respect to the first set of actions;
determining, using the execution history, a first frequency with which processing of the first set of actions resulted in a timed out status; and
based at least in part on the first frequency, ceasing processing with respect to the first set of actions.

14. The method of claim 13, further comprising:
sending, to the first component, a directive to perform the first action;
receiving, from the first component, an indicator representing processing of the first action timed out; and
storing an association between the first set of actions and the indicator,
wherein determining the first frequency is based at least in part on the association.

15. The method of claim 14, wherein the first data is received from a sensor and wherein the method further comprises:

determining, based at least in part on the first frequency, that the sensor is functioning improperly.

16. The method of claim 13, further comprising:
determining, in the execution history, second data representing a most recent instance when the first component performed processing with respect to the first action;
determining the second data represents the first component is currently performing the processing with respect to the first action; and
ceasing processing, with respect to the first set of actions, further based at least in part on the second data representing the first component is currently performing the processing with respect to the first action.

17. The method of claim 13, further comprising:
determining, in the execution history, natural language understanding (NLU) results data corresponding to the first action;
determining a predicted result of processing performed with respect to the NLU results data;
determining, in the execution history, a first result of the processing performed with respect to the NLU results data;
determining the predicted result is different from the first result; and
ceasing processing, with respect to the first set of actions, further based at least in part on the predicted result being different from the first result.

18. The method of claim 13, wherein the first data comprises at least one of:
determining a second set of actions previously prevented from being executed;
determining the first set of actions corresponds to the second set of actions; and
ceasing processing, with respect to the first set of actions, further based at least in part on the first set of actions corresponding to the second set of actions.

19. The method of claim 18, wherein:
the first set of actions corresponds to a first profile identifier; and
the second set of actions corresponds to a second profile identifier.

20. The method of claim 13, further comprising:
receiving second data representing the first set of actions are to be performed;
determining a subset of the first set of actions is to be performed; and
based at least in part on determining the subset is to be performed, causing the first action to be performed.

* * * * *